US011624861B2

(12) United States Patent
Cammenga et al.

(10) Patent No.: US 11,624,861 B2
(45) Date of Patent: Apr. 11, 2023

(54) VEHICULAR REARVIEW ASSEMBLIES HAVING POLARIZED DISPLAYS USING ELECTRO-OPTIC ELEMENT

(71) Applicant: Gentex Corporation, Zeeland, MI (US)

(72) Inventors: David J. Cammenga, Zeeland, MI (US); Adam R. Heintzelman, Grand Rapids, MI (US); Xiaoxu Niu, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 953 days.

(21) Appl. No.: 16/176,477

(22) Filed: Oct. 31, 2018

(65) Prior Publication Data

US 2019/0162881 A1 May 30, 2019

Related U.S. Application Data

(60) Provisional application No. 62/590,858, filed on Nov. 27, 2017.

(51) Int. Cl.
  *B60R 1/04* (2006.01)
  *G02B 5/08* (2006.01)
  (Continued)

(52) U.S. Cl.
  CPC .............. *G02B 5/0816* (2013.01); *B60R 1/04* (2013.01); *B60R 1/088* (2013.01); *G02B 5/3025* (2013.01);
  (Continued)

(58) Field of Classification Search
  CPC ......... B60R 1/04; B60R 1/088; G02B 5/0816; G02B 5/3025; G02B 5/3058; G02B 27/28;
  (Continued)

(56) References Cited

U.S. PATENT DOCUMENTS 4,961,625 A 10/1990 Wood et al.
6,577,360 B1* 6/2003 Akiyama .......... G02F 1/133528
  349/97
(Continued)

FOREIGN PATENT DOCUMENTS

CN 1329725 A 1/2002
CN 1470914 A 1/2004
(Continued)

OTHER PUBLICATIONS

Chinese Office Action and Search Report, Application No. 2018800720865, dated Jul. 1, 2022 (20 pages).

*Primary Examiner* — Ryan S Dunning
(74) *Attorney, Agent, or Firm* — Price Heneveld LLP; Brian James Brewer

(57) ABSTRACT

A vehicular rearview assembly, includes a front substrate defining a first surface and a second surface. The front substrate being substantially transparent. The front substrate defines a shaped edge along a periphery of the first surface. A first polarizer is coupled with the second surface. An electro-optic element is coupled to the first polarizer having a first substrate defining a first element surface and a second element surface. A second substrate is spaced away from the first substrate and defines a third element surface and a fourth element surface. An electro-optic material is positioned between the first and second substrates. A second polarizer is coupled to the fourth element surface. A display is configured to emit light having a first polarization into the second polarizer. A reflective layer is positioned between the front substrate and the display is configured to reflect both the first polarization of light and a second polarization of light.

20 Claims, 2 Drawing Sheets

(51) Int. Cl.
   *G02B 5/30*   (2006.01)
   *G02B 27/28*  (2006.01)
   *G02F 1/1335* (2006.01)
   *B60R 1/08*   (2006.01)

(52) U.S. Cl.
   CPC .......... *G02B 5/3058* (2013.01); *G02B 27/28* (2013.01); *G02B 27/286* (2013.01); *G02F 1/133536* (2013.01)

(58) Field of Classification Search
   CPC ............ G02B 27/286; G02F 1/133331; G02F 1/133512; G02F 1/133536; G02F 1/13471; G02F 1/136209
   See application file for complete search history.

(56) References Cited

U.S. PATENT DOCUMENTS

| | | | |
|---|---|---|---|
| 6,864,927 | B1 | 3/2005 | Cathey |
| 6,979,499 | B2 | 12/2005 | Walck et al. |
| 7,123,418 | B2 | 10/2006 | Weber et al. |
| 7,636,188 | B2 | 12/2009 | Bauer et al. |
| 8,767,145 | B2 | 7/2014 | Zhang |
| 9,429,757 | B1 | 8/2016 | Peeri |
| 9,927,609 | B2 | 3/2018 | Cammenga et al. |
| 10,101,583 | B2 | 10/2018 | Saenger Nayver et al. |
| 2002/0196518 | A1 | 12/2002 | Xu et al. |
| 2004/0125430 | A1 | 7/2004 | Kasajima et al. |
| 2004/0245902 | A1 | 12/2004 | Li et al. |
| 2005/0200934 | A1 | 9/2005 | Callahan et al. |
| 2006/0066508 | A1 | 3/2006 | Walck et al. |
| 2007/0127128 | A1* | 6/2007 | Hoegerl ................ B60R 1/088 359/604 |
| 2008/0094547 | A1 | 4/2008 | Sugita et al. |
| 2008/0218434 | A1 | 9/2008 | Kelly et al. |
| 2010/0097469 | A1 | 4/2010 | Blank et al. |
| 2010/0277786 | A1 | 11/2010 | Anderson et al. |
| 2012/0062527 | A1 | 3/2012 | Cheong et al. |
| 2013/0038511 | A1 | 2/2013 | Box |
| 2014/0055836 | A1 | 2/2014 | Cammenga et al. |
| 2015/0055207 | A1 | 2/2015 | Cammenga et al. |
| 2015/0085341 | A1 | 3/2015 | Ash et al. |
| 2015/0177563 | A1 | 6/2015 | Cho et al. |
| 2015/0185562 | A1 | 7/2015 | Baek et al. |
| 2015/0277203 | A1 | 10/2015 | VanderPloeg et al. |
| 2016/0026039 | A1 | 1/2016 | Sakai et al. |
| 2016/0216540 | A1 | 7/2016 | Cho et al. |
| 2016/0372058 | A1 | 12/2016 | Wang et al. |
| 2017/0052369 | A1 | 2/2017 | Shimatani et al. |
| 2017/0190290 | A1* | 7/2017 | Lin .................... B60R 1/088 |
| 2018/0129046 | A1 | 5/2018 | Cammenga et al. |
| 2019/0018242 | A1 | 1/2019 | Saenger Nayver et al. |
| 2019/0263322 | A1* | 8/2019 | Hayashi ............ G02F 1/133308 |
| 2019/0351827 | A1* | 11/2019 | Xue ..................... G02B 5/30 |

FOREIGN PATENT DOCUMENTS

| | | |
|---|---|---|
| CN | 1493016 A | 4/2004 |
| CN | 1573448 A | 2/2005 |
| CN | 1977211 A | 6/2007 |
| CN | 102203660 A | 9/2011 |
| CN | 102654682 A | 9/2012 |
| CN | 103558708 A | 2/2014 |
| CN | 104166268 A | 11/2014 |
| CN | 104919364 A | 9/2015 |
| CN | 105321434 A | 2/2016 |
| CN | 106249337 A | 12/2016 |
| CN | 106526951 A | 3/2017 |
| CN | 107077808 A | 8/2017 |
| CN | 106163873 B | 4/2019 |
| DE | 19631409 A1 | 2/1998 |
| DE | 102012019506 A1 | 4/2014 |
| EP | 2008869 A1 | 12/2008 |
| EP | 2131227 A1 | 9/2009 |
| FR | 2922328 A1 | 4/2009 |
| GB | 2368403 A | 5/2002 |
| JP | H07140308 A | 6/1995 |
| JP | 11194359 A | 7/1999 |
| JP | H11249061 A | 9/1999 |
| JP | H11249062 A | 9/1999 |
| JP | H11281916 A | 10/1999 |
| JP | 2000231105 A | 8/2000 |
| JP | 2004069926 A | 3/2004 |
| JP | 2005112352 A | 4/2005 |
| JP | 2010091621 A | 4/2010 |
| JP | 2010160504 A | 7/2010 |
| JP | 2010277016 A | 12/2010 |
| JP | 2014010321 A | 1/2014 |
| KR | 176767 B1 | 5/1999 |
| KR | 20120074499 A | 7/2012 |
| TW | 694112 B | 6/2004 |
| WO | 2000023826 A2 | 4/2000 |
| WO | 2003098339 A2 | 11/2003 |
| WO | 2007103342 A2 | 9/2007 |
| WO | 2008053109 A2 | 5/2008 |
| WO | 2009020846 A1 | 2/2009 |
| WO | 2009053609 A1 | 4/2009 |
| WO | 2009146837 A1 | 12/2009 |
| WO | 2011068852 A1 | 6/2011 |
| WO | 2013190959 A1 | 12/2013 |
| WO | 2014061138 A1 | 4/2014 |
| WO | 2015153740 A1 | 10/2015 |
| WO | 2016136100 A1 | 9/2016 |
| WO | 2017192551 A1 | 11/2017 |

* cited by examiner

VEHICULAR REARVIEW ASSEMBLIES HAVING POLARIZED DISPLAYS USING ELECTRO-OPTIC ELEMENT

CROSS-REFERENCE TO RELATED APPLICATION

This application claims priority to and the benefit under 35 U.S.C. § 119(e) of U.S. Provisional Application No. 62/590,858, filed on Nov. 27, 2017, entitled SWITCHABLE POLARIZED DISPLAYS, the disclosure of which is hereby incorporated herein by reference in its entirety.

FIELD

The disclosure generally relates to displays, and more particularly, to switchable displays which are polarized.

BACKGROUND

Reflective devices are used in a variety of automotive, nautical and aerospace applications. Often, the automotive, nautical and aerospace applications utilize one or more displays in addition to the reflective devices. Accordingly, it may be advantageous to provide a display which is switchable between reflective and display states thereby combining the reflective device and the display.

SUMMARY OF THE DISCLOSURE

According to some features of the present disclosure, a vehicular rearview assembly includes a front substrate defining a first surface and a second surface. The front substrate being substantially transparent. The front substrate defines a shaped edge along a periphery of the first surface. A first polarizer is coupled with the second surface. An electro-optic element is coupled to the first polarizer having a first substrate defining a first element surface and a second element surface. A second substrate is spaced away from the first substrate and defines a third element surface and a fourth element surface. An electro-optic material is positioned between the first and second substrates. A second polarizer is coupled to the fourth element surface. A display is configured to emit light having a first polarization into the second polarizer. A reflective layer is positioned between the front substrate and the display is configured to reflect both the first polarization of light and a second polarization of light.

According to some features of the present disclosure, a vehicular rearview assembly, includes a front substrate defining a first surface and a second surface. The front substrate being substantially transparent. The front substrate defines a shaped edge along a periphery of the first surface. A concealment layer is coupled with the second surface. An absorbing polarizer is coupled with the second surface. An electro-optic element is coupled to the absorbing polarizer including a first substrate defining a first element surface and a second element surface. A second substrate is spaced away from the first substrate and defines a third element surface and a fourth element surface. An electro-optic material is positioned between the first and second substrates. A reflective polarizer is coupled to the fourth element surface. A display is configured to emit a first polarization of light into the second polarizer.

According to further aspects of the present disclosure, a vehicular rearview assembly includes a front substrate defining a first surface and a second surface. The front substrate defines a shaped edge having a radius of curvature of about 2.0 mm or greater along a periphery of the first surface. A concealment layer is coupled with the second surface. An absorbing polarizer is coupled with the second surface. A liquid crystal element is coupled with the absorbing polarizer. A reflective polarizer is coupled with the liquid crystal element. A display is configured to emit light into the reflective polarizer.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1B:
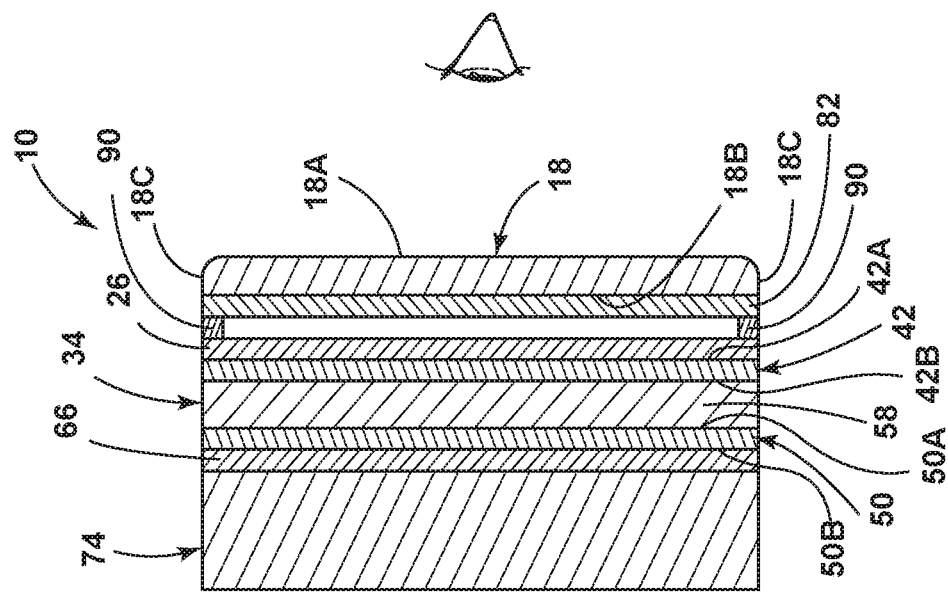
FIG. 1B is a cross-sectional view of the rearview display assembly, according to at least one example.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1A-2B, reference numeral 10 generally designates a vehicular rearview assembly. The assembly 10 includes a front substrate 18 defining a first surface 18A and a second surface 18B. According to various examples, the front substrate 18 may be substantially transparent. The front substrate 18 defines a shaped edge 18C along a periphery of the first surface 18A. A first polarizer 26 is coupled with the second surface 18B. An electro-optic element 34 is coupled to the first polarizer 26. The electro-optic element 34 includes a first substrate 42 defining a first element surface 42A and a second element surface 42B. A second substrate 50 is spaced away from the first substrate 42 and defines a third element surface 50A and a fourth element surface 50B. An electro-optic material 58 is positioned between the first and second substrates 42, 50. A second polarizer 66 is coupled to the fourth element surface 50B of the electro-optic element 34. A display 74 is configured to emit light having a first polarization of light $P_1$ into the second polarizer 66. A reflective layer 82 positioned between the front substrate 18 and the display 74 and is configured to reflect both the first polarization of light $P_1$ and a second polarization of light $P_2$.

Figure 1A:
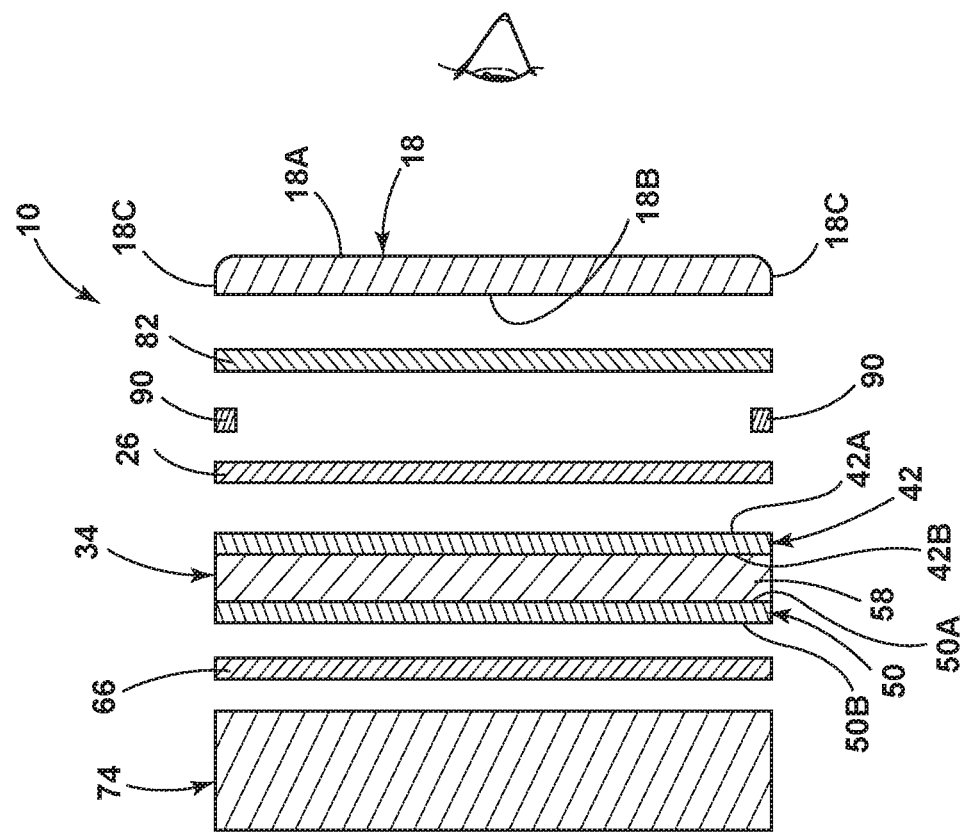
FIG. 1A is an exploded cross-sectional view of a rearview display assembly, according to at least one example.

Referring now to FIGS. 1A and 1B, although depicted as a vehicular rearview assembly 10, the disclosure related to the assembly 10 may equally be applied to displays, screens, computer monitors, televisions, side view mirrors, heads-up displays and/or other applications without departing from the teachings provided herein. The assembly 10 may be utilized in automotive, nautical, aerospace, architectural and/or other applications. As will be explained in greater detail below, the assembly 10 is operable between a reflective state and a display state. In the reflective state, the assembly 10 is configured to reflect incident light on the assembly 10 back toward a viewer of the assembly 10. As such, the assembly 10 may function as a mirror in the reflective state. In the display state, the assembly 10 may be configured to transmit light from the display 74 through the assembly 10 to a viewer of the assembly 10. The display 74, and therefore the assembly 10, may be configured to transmit data, images and other information to a viewer of the assembly 10. The assembly 10 is switchable between the reflective and display states and as such the assembly 10 may be referred to as a switchable assembly 10.

The front substrate 18 is positioned proximate a viewer side, or front, of the assembly 10. Depending on the positioning of the assembly 10 within its environment, the front substrate 18 may be positioned in a vehicle rearward, a vehicle forward position, a vehicle outward and/or vehicle inward position relative to the rest of the assembly 10. The front substrate 18 may have a thickness (e.g., as measured from the minimum or maximum distance between first surface 18A to the second surface 18B) of from about 0.1 mm to about 3.5 mm and all values therebetween. For example, the thickness of the front substrate 18 may be about 3.5 mm or less, about 3.0 mm or less, about 2.5 mm or less, about 2.2 mm or less, about 2.0 mm or less, about 1.5 mm or less, about 1.2 mm or less, or about 1.0 mm or less. Further, the thickness of the front substrate 18 may vary with position. The front substrate 18 may take a variety of shapes including square, rectangular, circular, oblong, triangular and higher order polygons. The front substrate 18 may have a length and/or width dimension of about 10 mm or greater, about 20 mm or greater, about 50 mm or greater, about 75 mm or greater, about 85 mm or greater, about 100 mm or greater, about 150 mm or greater, about 175 mm or greater, about 200 mm or greater, about 250 mm or greater, about 300 mm or greater or about 500 mm or greater. According to various examples, the front substrate 18 may have a curvature across the length or width (i.e., a vertical or horizontal axis) of the front substrate 18. For example, the front substrate 18 may have a radius of curvature of about 2000 mm or less, about 1500 mm or less, about 1300 mm or less, about 1250 mm or less, about 1200 mm or less, about 1100 mm or less, about 1000 mm or less, about 900 mm or less, about 800 mm or less, about 700 mm or less, about 600 mm or less, about 500 mm or less, about 400 mm or less, about 300 mm or less, about 200 mm or less or about 100 mm or less. For purposes of this disclosure, the radius of curvature of a curved surface (e.g., the first surface 18A) equals the radius of the circular arc which best approximates the curve of that surface where the curve remains constant and/or the length of that surface.

The front substrate 18 may include a variety of materials transparent in the visible region of the electromagnetic spectrum including soda-lime float glass, EAGLE® glass, alkaline earth boro-aluminosilicate glass, GORILLA® glass, alkali-aluminosilicate glass, borosilicate glass, chemically strengthened glass, heat-strengthened glass, insulated glass, tempered glass, sapphire, optical crystals, diamond, quartz, ceramics, polymers and/or plastics. In plastic examples, the front substrate 18 may include polymer composed of one or more of cycloolefin, polyethylene terephthalate, polyethylene naphthalate, polyimide, high density polyethylene, polysulfone, acrylic, polycarbonate, acrylonitrile butadiene styrene, polychlorotrifluoroethylene, polyphenylene sulfide, poly(methyl methacrylate), polyvinyl alcohol, ethylene vinyl alcohol, moisture-resistant polymers, gas resistant polymers and/or combinations thereof. It will be understood that in various examples, the front substrate 18 may be transparent, translucent and/or opaque. For example, the front substrate 18 may be substantially transparent, or configured to allow about 50% or greater of visible light (i.e., light with a wavelength of about 450 nm to about 700 nm) incident on the substrate 18 to be transmitted.

According to various examples, the front substrate 18 defines the shaped edge 18C along a periphery of the first surface 18A. In other words, the shaped edge 18C is defined at a perimeter of the front substrate 18 and/or the first surface 18A. The shaped edge 18C may extend around a portion, a majority, substantially all or the entire perimeter of the front substrate 18. According to various examples, the shaped edge 18C extends fully around a perimeter of the front substrate 18. The shaped edge 18C may have a radius of curvature of from about 2.0 mm to about 3.0 mm and all values therebetween. For example, the shaped edge 18C may have a radius of curvature of about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, or about 3.0 mm. In some examples, the shaped edge 18C has a radius of curvature of about 2.0 mm or greater or about 2.5 mm or greater. It will be understood that the radius of curvature of the shaped edge 18C may vary across its length. For example, the radius of curvature measured at one point may be about 2.5 mm, while at other points it may be different (e.g., about 2.7 mm or about 2.4 mm). The shaped edge 18C may be produced via grinding, etching, laser ablation, breaking and/or other methods of removing material from the front substrate 18. In some examples, the shaped edge 18C may be substantially formed while the front substrate 18 is being formed (e.g., during a casting or injection molding step). In examples where the shaped edge 18C is created after the front substrate 18 is formed, the shaped edge 18C may be made before, during and/or after joining of the components of the assembly 10.

It will be understood that the assembly 10 may include one or more bezels, housings, shrouds and/or other structures extending at least partially around the front substrate 18, the shaped edge 18C and/or the assembly 10 without departing from the teachings provided herein. The bezels, housings, shrouds and/or other structures may be bonded to sides of components of the assembly 10 (e.g., the electro-optic element 34) or bonded to a back of the display 74.

The first polarizer 26 is positioned between the front substrate 18 and the first substrate 42 of the electro-optic element 34. In practice, the first polarizer 26 may be coupled to the second surface 18B and/or the first element surface 42A of the first substrate 42. The first polarizer 26 may be laminated and/or optically bonded (e.g., through an optical coupling adhesive) to the second surface 18B and/or the first element surface 42A of the first element 42. In examples where the first polarizer 26 is coupled to the front substrate 18, the first polarizer 26 may extend fully to the edges of the second surface 18B (e.g., proximate the shaped edge 18C) and/or substantially to the edges.

According to various examples, the first polarizer 26 is an absorbing polarizer. For purposes of this disclosure, an absorbing polarizer is a structure configured to transmit the first polarization of light $P_1$ (e.g., vertical, 45°, horizontal and/or any orientation therebetween) and absorb the second polarization of light $P_2$ (e.g., vertical, 45°, horizontal and/or any orientation therebetween). According to various examples, the first polarizer 26 is configured to transmit the first polarization of light $P_1$ (e.g., vertical) and absorb the second polarization of light $P_2$ (e.g., horizontal) which is perpendicular to the first polarization of light $P_1$. According to various examples, the first polarizer 26 may have a high transmission of light incident on the first polarizer 26 (e.g., of the first polarization of light $P_1$). According to various examples, the first polarizer 26 may have a transmission of the first polarization of light of about 85% or greater, about 86% or greater, about 87% or greater, about 88% or greater, about 89% or greater, about 90% or greater, about 91% or greater, about 92% or greater, about 93% or greater, about 94% or greater, about 95% or greater, about 96% or greater, about 97% or greater, about 98% or greater, or about 99% or greater. The first polarizer 26 may have a total transmission (i.e., transmission as measured relative to the total amount of light including all polarizations of light) of from about 43% to about 55% and all value therebetween. For example, the first polarizer 26 may have a total transmission of about 43% or more, about 44% or more, about 45% or more, about 46% or more, about 47% or more, about 48% or more, about 49% or more, about 50% or more, about 51% or more, about 52% or more, about 53% or more, about 54% or more or about 55% or more. Interpreted physically, the first polarizer 26 may have a high transmission of the first polarization of light $P_1$ and a small transmission of the second polarization of light $P_2$.

High transmission of the first polarization of light $P_1$ in addition to some transmission of the second polarization of light $P_2$ (e.g., about 20% or less) may aid in increasing the reflectance of the reflective state of the assembly 10. As the transmission of the second polarization $P_2$ increases, the low-end total reflectance for the assembly 10 will also increase. In the reflective state of the assembly 10, most of the transmitted the second polarization of light $P_2$ will be reflected from reflective examples of the second polarizer 66. For example, when the first polarizer 26 has approximately 90% transmission of the first polarization of light $P_1$ and approximately 30% transmission of the second polarization of light $P_2$, most of the transmitted second polarization of light $P_2$ will be reflected off of the second polarizer 66 and back out of the assembly 10. In such an example, as the first polarizer 26 transmits 30% of the second polarization of light $P_2$, about 30% of this reflected light will pass through the first polarizer 26. This will add approximately 9% reflectance of the second polarization of light $P_2$, or about 4.5% total light reflectance to the assembly 10. The low-end reflectance of the assembly 10 may have 4% reflectance off of the first surface 18A combined with about 4.5% reflectance from the second polarizer 66 and optionally an additional 4% from other internal surfaces for a total reflectance of about 12.5%. The total reflectance may be about 15% or lower, or about 10% or lower. Antireflective coatings may be applied to the first surface 18A and may drop the reflectance of the first surface 18A down to about 1% or less, about 0.2% or less, or about 0.1% or less. In another example, the first polarizer 26 may have a transmission of the first polarization of light $P_1$ of about 87% and a transmission of about 14% of the second polarization of light $P_2$. In such an example, the assembly 10 may have approximately 2% of the second polarization of light $P_2$ reflected back out of the assembly 10 which is approximately 1% of added total light reflectance. The low-end reflectance of such an example of the assembly 10 may have 4% reflectance off of the first surface 18A combined with about 1% reflectance of the second polarization of light $P_2$ through the first polarizer 26. An additional 4% percent reflection may occur from other internal surfaces for a total of about 9% total reflectance. Antireflective coatings may be applied to the first surface 18A to bring the total reflectance down to about 5% in this example.

Absorbing polarizer examples of the first polarizer 26 may be formed of a material configured to preferentially allow the transmission of the first polarization of light $P_1$ and preferentially absorb the second polarization of light $P_2$. For example, the first polarizer 26 may be formed of a dichroic dye-based switchable system, a dye-based polarizer, an iodine-based polarizer and/or a wire grid polarizer.

The electro-optic element 34 is positioned between the first polarizer 26 and the second polarizer 66. As explained above, the electro-optic element 34 includes the first element substrate 42, the second element substrate 50 and the electro-optic material 58. The first and/or second element substrates 42, 50 may have a thickness of from about 0.1 mm to about 3.0 mm and all values therebetween. For example, the first and/or second element substrates 42, 50 may have a thickness of about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 1.2 mm, about 1.4 mm, about 1.6 mm, about 1.8 mm, about 2.0 mm, about 2.2 mm, about 2.4 mm, about 2.6 mm, about 2.8 mm, or about 3.0 mm. The electro-optic material 58 is positioned between the second element surface 42B and the third element surface 50A. The first and/or second element substrates 42, 50 may be composed of any of the materials described above in connection with the front substrate 18.

According to various examples, the electro-optic material 58 is a liquid crystal material. The liquid crystal material may have or include nematic, smectic, columnar and/or cholesteric phases. According to various examples, the electro-optic elements 34 may include one or more electrodes configured to apply an electrical potential, or field, across the electro-optic material 58. In examples where the electro-optic material 58 is a liquid crystal material, such application of the electrical field may induce twisting and/or untwisting of liquid crystal molecules that results in the rotating of the polarization of the light (e.g., from the first polarization of light P1 to the second polarization of light P2). For example, vertically polarized light (e.g., the first polarization of light P1) may be rotated into horizontally polarized light (e.g., the second polarization of light P2). Further, in the untwisted state of the liquid crystal molecules, the first polarization of light P1 may be transmitted through the electro-optic element 34 without substantial alteration of the polarization. As such, the electro-optic element 34 and/or electro-optic material 58 may have a transmission polarization (e.g., the first polarization of light P1 or vertical). According to various examples, the transmission polarization may be in line with the polarization of light emitted from the display 74 (e.g., the first polarization of light P1).

According to various examples, the electrical potential applied to the electro-optic material 58 of the electro-optic element 34 may be variably adjusted. Variable adjustment of the electrical potential may variably adjust how much of the light passing through the electro-optic element 34 is rotated between polarizations. As will be explained in greater detail below, by adjusting how much of the light is rotated, the reflectance of the assembly 10 may be adjusted. For example, the assembly 10 may have a variable total reflectance of from between about 8% to about 52% as adjusted by the electro-optic element 34.

The electro-optic material 58 of the electro-optic element 34 may be arranged into an unsegmented cell or segmented cell. For example, in an unsegmented cell, the entirety of the liquid crystal material may be changed while in segmented cell examples various portions of the electro-optic element 34 may be changed. In other words, in unsegmented cell examples, the electro-optic element 34 is a single pixel while in segmented cell examples, the electro-optic element 34 includes a plurality of pixels. In segmented cell examples of the electro-optic material 58, the different segments may be electrically isolated while not being physically isolated. As will be explained in greater detail below, activation of the cells of the electro-optic element 34 may transition the assembly 10 between the display and reflective states. The electro-optic element 34 may include a seal disposed around a perimeter of the electro-optic material 58. The seal may extend between the second element surface 42B and the third element surface 50A.

The second polarizer 66 is positioned between the electro-optic element 34 and the display 74. According to various examples, the second polarizer 66 is coupled to the fourth element surface 50B of the electro-optic element 34. The second polarizer 66 may be laminated or optically coupled (e.g., through an optical coupling adhesive) to the fourth element surface 50B. In some examples, the second polarizer 66 may be a standalone polarizer while in other examples the second polarizer 66 may be coupled, bonded or otherwise supported by a polarizer substrate. According to various examples, the second polarizer 66 may be a reflective polarizer. For purposes of this disclosure, a reflective polarizer is a polarizer which transmits one polarization of light and reflects another polarization of light. According to various examples, the second polarizer 66 may be configured to transmit the first polarization of light $P_1$ and reflect the second polarization of light $P_2$. The second polarizer 66 may have a total reflectance (e.g., the reflectance of all polarization the light) of from about 40% to about 60% and all values therebetween. For example, the second polarizer 66 may have a total reflectance of about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59% or about 60%. In reflective polarizer examples, the second polarizer 66 may be a linear polarizer, an elliptical polarizer or a circular polarizer and might include an optical retarder such as a quarter-wave plate or a half-wave plate. Alternatively, a reflective polarizer may include a polymer-based film structure including at least one optically anisotropic layer. Such polymer-based film structure is generally referred to herein as an anisotropic polymer-based film (APBF). Non-limiting examples of APBFs are provided by a multilayered polymer film, including a body of alternating layers of a crystalline-based polymer and another selected polymer, or by microstructured film-based polarizers, such as brightness enhancement films, or by dual brightness enhancement films.

The assembly 10 may further include a concealment layer 90. The concealment 90 may be known as a spectral filter, reflective ring and/or hiding layer. Concealment layer 90 may be composed of an ink, a metal, or other material which is either reflective and/or opaque. The concealment layer 90 may be positioned at various points throughout the assembly 10. The assembly 10 may include one or more concealment layers 90. In the depicted example, the concealment layer 90 is disposed on the second surface 18B proximate the first polarizer 26, but it will be understood that the concealment layer 90 may be positioned proximate the second polarizer 66. According to other examples, the concealment layer 90 may be positioned within the electro-optic element 34. Use of the concealment layer 90 may be advantageous in hiding edges of the first polarizer 26, the second polarizer 66 and/or seals of the electro-optic element 34. For example, the concealment layer 90 may be disposed along the perimeter of the second surface 18B such that the edges of the first polarizer 26 may not be visible. Such a feature may be advantageous in that precise cutting and formation of the first polarizer 26 may be difficult at the edges and use of the concealment layer 90 may provide an aesthetically pleasing concealment of the edges. In various examples, the first polarizer 26 may fully be within the perimeter of the concealment layer 90. In reflective examples of the concealment layer 90, the concealment layer 90 may be positioned proximate the second polarizer 66. As the second polarizer 66 may be a reflective polarizer, and therefore reflect lights, the positioning of reflective examples of the concealment layer 90 proximate the second polarizer 66 (e.g., inside or outside of the electro-optic element 34) may reduce a perceived parallax between the reflected images. Further, as with the first polarizer 26, use of the concealment layer 90 proximate the perimeter of the second polarizer 66 may be advantageous in concealing edges of the second polarizer 66. In another example, the concealment layer 90 may be positioned between the electro-optic element 34 and the first polarizer 26 to conceal edges and/or seals of the electro-optic element 34.

The reflective layer 82 is positioned proximate the first substrate 18 of the assembly 10. In various examples, the reflective layer 82 is positioned on the first surface 18A. In various examples, the reflective layer 82 is positioned on the second surface 18B. In yet other examples, the reflective layer 82 may be positioned on the first polarizer 26 between the first polarizer 26 and the first substrate 18. According to various examples, the concealment layer 90 may be positioned on the second surface 18B and the reflective layer 82 may be positioned on, or coupled to, the concealment layer 90 on an opposite side than the second surface 18B. As such, the reflective layer 82 may be said to be coupled to the first substrate 18. The reflective layer 82 is configured to increase the reflectance of the assembly 10 by reflecting all polarizations of light. The reflective layer 82 may be configured so as to include a quarter-wave stack of thin-film layers such as titania ($TiO_2$) and silica ($SiO_2$), lustrous metals and/or combinations thereof. Use of the reflective layer 82 may be advantageous in increasing the total reflectance of the assembly 10 in the reflective state. Additionally or alternatively, a quarter-wave polarizer may be positioned on the first and/or second surfaces 18A, 18B such that polarization effects due to the first and second polarizers 26, 66 may be removed.

The display 74 is configured to emit light of the first polarization $P_1$ in the form of an image and/or general illumination. The display 74 may include one or more light engines, liquid crystal elements and/or polarizers to produce an image. The display 74 may extend the entire length and/or width of the assembly 10 creating a "full-display" assembly, or may only extend a portion of the length and/or width. It will be appreciated, however, that a concept of a "full-display" assembly, where the display 74, or a plurality of displays 74, overlaps in projection onto a viewable surface of assembly 10 (e.g., the first surface 18A), with most or all of the viewable surface, is also contemplated by the various examples of this disclosure. In yet other examples, the display 74 may extend over only a portion of the assembly 10. As will be explained in greater detail below, the light and/or image emitted from the display 74 may have the same polarization as the transmission polarization of the first polarizer 26 and second polarizer 66 and pass through the electro-optic element 34 essentially unaltered such that the image or light from the display 74 exits the assembly 10.

Figure 2A:
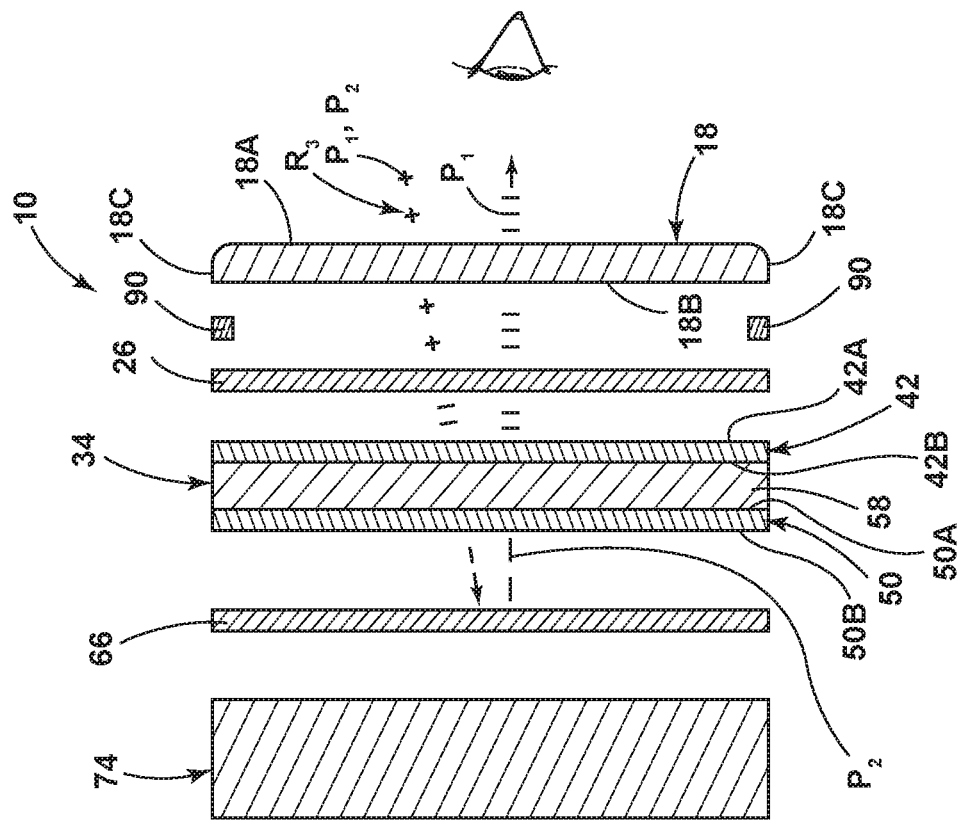
FIG. 2A is an exploded cross-sectional view of a rearview display assembly in a display state, according to at least one example.
Figure 2B:
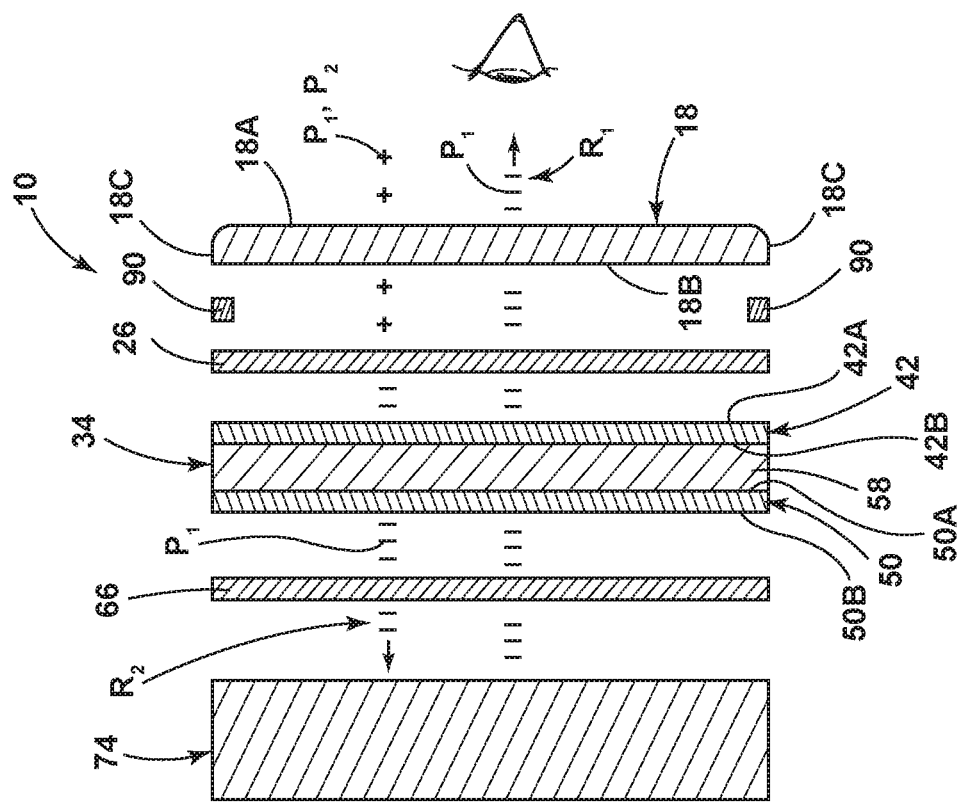
FIG. 2B is an exploded cross-sectional view of a rearview display assembly in a reflective state, according to at least one example.

Referring now to FIGS. 2A and 2B, the assembly 10 is operable in the display state (FIG. 2A) and the reflective state (FIG. 2B). In the display state, the light of the first polarization $P_1$ is emitted from the display 74 as a first light ray $R_1$ into the second polarizer 66. As the second polarizer 66 is transmissive to the light of the first polarization $P_1$, the first light ray $R_1$ passes through the second polarizer 66 and into the electro-optic element 34. While the assembly 10 is operating in the display state, the electro-optic element 34 is set to a transmission mode where the light of the first polarization $P_1$ passes through substantially unaltered onto the first polarizer 26. As the first polarizer 26 is transmissive to the light of the first polarization $P_1$, the first light ray $R_1$ passes into the front substrate 18 and toward a viewer of the assembly 10. As explained above, the electro-optic element 34 may have a variable electric field applied to the electro-optic material 58 such that the amount of light of the first polarization $P_1$ passing through may be controlled. Interpreted physically, the assembly 10 may be dimmed by decreasing the transmission of light of the first polarization $P_1$.

Ambient light, shown as the second light ray $R_2$, impinging on the assembly 10 in the display state may have the light of the first and second polarizations $P_1$, $P_2$. The ambient light passes through the front substrate 18 and impinges on the first polarizer 26. As the first polarizer 26 is configured to transmit light of the first polarization $P_1$ and absorb light of the second polarization $P_2$, only about 50% or less of the total light passes through the first polarizer 26. In other words, only the light of the first polarization $P_1$ passes through the first polarizer 26 onto the electro-optic element 34. As the electro-optic element 34 is in the transmissive state, the light of the first polarization $P_1$ passes through the electro-optic element 34 onto the second polarizer 66, substantially unaltered. As the light of the second polarization $P_2$ has been filtered out, the light of the first polarization $P_1$ passes through the second polarizer 66, without substantial back reflection toward the front substrate 18, and toward the display 74. In practical terms, the assembly 10 while in the display state primarily emits light of the first polarization from the display 74. As such, images and light provided by the display 74 is the predominant feature seen by a viewer of the assembly 10. In the display state, the assembly 10 may emit greater than about 80% of light from the display 74 through the front substrate 18.

Referring now to FIG. 2B, the assembly 10 is also operable in the reflective state. In reflective state, the display 74 may be turned off or otherwise configured to not emit light. Ambient light, shown as third light ray $R_3$, proximate the assembly 10 enters the front substrate 18 and passes through to the first polarizer 26. The third light ray $R_3$ includes the light of the first and second polarizations $P_1$, $P_2$. As the first polarizer 26 is configured to transmit light of the first polarization $P_1$ and absorb light of the second polarization $P_2$, light of the first polarization passes $P_1$ through and onto the electro-optic element 34 while the light of the second polarization $P_2$ is absorbed. In the reflective state, electro-optic element 34 is configured to rotate the light of the first polarization $P_1$ to the light of the second polarization $P_2$. The light of the second polarization $P_2$ exits the electro-optic element 34 and impinges on the second polarizer 66. As the second polarizer 66 is configured to transmit the light of first polarization $P_1$ and reflect light of the second polarization $P_2$, the light of the second polarization $P_2$ is reflected back toward the electro-optic element 34. Once again, as the electro-optic element 34 is configured to rotate the polarization of light, the light of the second polarization $P_2$ is rotated into the light of the first polarization $P_1$ and emitted onto the first polarizer 26. As the first polarizer 26 is configured to transmit the light of the first polarization $P_1$, the reflected light is transmitted to the front substrate 18 into a viewer of the assembly 10. As such, in the reflective state, the assembly 10 reflects the third light ray $R_3$ off of the second polarizer 66 to form a reflected image for a viewer of the assembly 10. As explained above, the electro-optic element 34 may have a variable electric field applied to the electro-optic material 58 such that the amount of light passing through the electro-optic element 34 may be controlled. Interpreted physically, the assembly 10 may be dimmed by decreasing the transmission of light of the first polarization $P_1$ which is rotated and thereby reflected. As such, the reflectance of the assembly 10 may be dimmed. The assembly 10 may have a total low-end reflectance, or total reflectance of all light when dimmed, of about 5% or greater, about 6% or greater, about 7% or greater, about 8% or greater, about 9% or greater, about 10% or greater, about 11% or greater, about 12% or greater, about 13% or greater, about 14% or greater, or about 15% or greater. It will be understood that the low-end reflectance may be present while the assembly 10 is in the display state as explained in greater detail below. The assembly 10 may have a high-end reflectance, or total reflectance of all light when not dimmed, of about 35% or greater, about 36% or greater, about 37% or greater, about 38% or greater, about 39% or greater, about 40% or greater, about 41% or greater, about 42% or greater, about 43% or greater, about 44% or greater, about 45% or greater, about 46% or greater, about 47% or greater, about 48% or greater, about 49% or greater or about 50% or greater.

Use of the present disclosure may offer a variety of advantages. First, as the electro-optic element 34 is operable to transmit light in both a rotated and unrotated state, use of the display 74 and the second polarizer 66 allow the assembly 10 to be switchable between the reflective and display states. Such a feature may be advantageous in allowing the production of a rearview mirror assembly 10 which may function as a conventional mirror (e.g., due to the reflection by the second polarizer 66) and an electronic display capable of showing a plurality of camera and computer-generated images. Second, use of the liquid crystal material of the electro-optic material 58 may allow for electronic dimming of the assembly 10. Third, use of the concealment layer 90 may allow greater manufacturing tolerances associated with the first polarizer 26, second polarizer 66 and/or the electro-optic element 34 as the concealment layer 90 may be used to cover edges of these components.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A vehicular rearview assembly, comprising:
a front substrate defining a first surface and a second surface, the front substrate being substantially transparent, wherein the front substrate defines a shaped edge along a periphery of the first surface;
a first polarizer coupled with the second surface;
an electro-optic element coupled to the first polarizer, comprising:
a first substrate defining a first element surface and a second element surface;
a second substrate spaced away from the first substrate and defining a third element surface and a fourth element surface; and
an electro-optic material positioned between the first and second substrates;
a second polarizer coupled to the fourth element surface;
a display located on an opposite side of the electro-optic element than the front substrate, the display configured to emit light having a first polarization into the second polarizer; and
a reflective layer comprising a film and positioned on one of the first surface and the second surface configured to increase the total reflectance of the assembly and to reflect both the first polarization of light and a second polarization of light.

2. The assembly of claim 1, wherein the first and second polarizers are each configured to transmit the first polarization of light.

3. The assembly of claim 1, wherein both the first and second polarizers are configured to transmit vertically polarized light and a concealment layer is positioned within the electro-optic element.

4. The assembly of claim 1, wherein the electro-optic material comprises a liquid crystal material.

5. The assembly of claim 4, wherein the electro-optic material is configured to rotate the first polarization of light to the second polarization of light.

6. The assembly of claim 1, wherein the first and second polarizers are configured to at least one of reflect or absorb the second polarization of light.

7. The assembly of claim 6, wherein the first polarizer is an absorbing polarizer.

8. The assembly of claim 7, wherein the second polarizer is a reflecting polarizer.

9. The assembly of claim 1, wherein the reflective layer is positioned on the second surface and the film is comprised of a quarter-wave stack of thin-film layers.

10. A vehicular rearview assembly, comprising:
a front substrate defining a first surface and a second surface, the front substrate being substantially transparent, wherein the front substrate defines a shaped edge along a periphery of the first surface;

an absorbing polarizer coupled with the second surface;
an electro-optic element coupled to the absorbing polarizer, comprising:
   a first substrate defining a first element surface and a second element surface;
   a second substrate spaced away from the first substrate and defining a third element surface and a fourth element surface; and
   an electro-optic material positioned between the first and second substrates;
a concealment layer positioned within the electro-optic element;
a reflective polarizer coupled to the fourth element surface, wherein the reflective polarizer includes a perimeter that is within a perimeter of the concealment layer; and
a display configured to transmit data, images, and other information to a viewer by emitting a first polarization of light into the reflective polarizer.

11. The assembly of claim 10, wherein the shaped edge has a radius of curvature of about 2 mm or greater.

12. The assembly of claim 10, wherein the shaped edge has a radius of curvature of about 2.5 mm or greater.

13. The assembly of claim 10, wherein the shaped edge extends fully around a perimeter of the front substrate.

14. The assembly of claim 10, wherein the concealment layer is at least one of reflective and opaque.

15. The assembly of claim 10, wherein the absorbing polarizer has a total transmittance of about 45% or more of visible light.

16. The assembly of claim 15, wherein the absorbing polarizer has a total transmittance of about 48% or more of visible light.

17. A vehicular rearview assembly, comprising:
   a front substrate defining a first surface and a second surface, wherein the front substrate defines a shaped edge having a radius of curvature of about 2.0 mm or greater along a periphery of the first surface;
   a reflective layer positioned on the second surface and configured to increase the total reflectance of the assembly;
   a concealment layer coupled with the reflective layer opposite the second surface, wherein the concealment layer is at least one of reflective and opaque;
   an absorbing polarizer positioned between the concealment layer and a liquid crystal element;
   a reflective polarizer coupled with the liquid crystal element; and
   a display coupled with the liquid crystal element opposite the front substrate and configured to emit light into the reflective polarizer.

18. The assembly of claim 17, wherein the shaped edge extends fully around a perimeter of the front substrate.

19. The assembly of claim 17, wherein the absorbing polarizer has a total transmittance of about 48% or more of visible light and a transmittance of about 90% or greater of a first polarization of light.

20. The assembly of claim 19, wherein the absorbing polarizer, the reflective polarizer and the liquid crystal element are configured to transmit the same polarization of light.

* * * * *